(12) United States Patent
Nodera

(10) Patent No.: US 6,384,114 B1
(45) Date of Patent: May 7, 2002

(54) FLAME-RETARDANT POLYCARBONATE RESIN COMPOSITION AND ITS MOLDINGS

(75) Inventor: Akio Nodera, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/456,296

(22) Filed: Dec. 8, 1999

(30) Foreign Application Priority Data

Dec. 11, 1998 (JP) .......................... 10-352998
Dec. 14, 1998 (JP) .......................... 10-354182

(51) Int. Cl.[7] ............................................ C08K 5/523
(52) U.S. Cl. .................. 524/127; 524/145; 524/174; 524/87
(58) Field of Search .................. 524/174, 87, 145, 524/127; 528/196

(56) References Cited

U.S. PATENT DOCUMENTS

| | | | | |
|---|---|---|---|---|
| 5,036,126 A | * | 7/1991 | Rinehart et al. | 524/145 |
| 5,043,200 A | * | 8/1991 | Kobayashi et al. | 525/148 |
| 5,218,069 A | * | 6/1993 | Enomoto et al. | 526/262 |
| 5,627,228 A | * | 5/1997 | Kobayashi | 524/127 |
| 5,837,757 A | | 11/1998 | Nodera et al. | |
| 6,022,917 A | * | 2/2000 | Kobayashi | 524/127 |
| 6,150,443 A | * | 11/2000 | Nodera et al. | 524/181 |
| 6,197,857 B1 | * | 3/2001 | Nodera et al. | 524/145 |

FOREIGN PATENT DOCUMENTS

| | | | |
|---|---|---|---|
| EP | 0909790 A1 | * | 10/1998 |
| EP | 0947560 A2 | * | 3/1999 |
| GB | 2330583 A | * | 4/1999 |
| WO | WO 00/36016 | * | 6/2000 |
| WO | WO 00/42106 | * | 7/2000 |

OTHER PUBLICATIONS

JP 06179807A, Eng. Ab., Jun. 28, 1994.*
JP 05156148A, Eng. Ab., Jun. 22, 1993.*
JP 6123882A, Eng. Ab., Apr. 17, 1985.*
DE 2940957A, Eng, Ab., Apr. 10, 1980.*

* cited by examiner

*Primary Examiner*—Margaret Medley
(74) *Attorney, Agent, or Firm*—Oblon, Spivak, McClelland, Maier & Nuestadt, P.C.

(57) ABSTRACT

Disclosed are non-halogen, flame-retardant polycarbonate resin compositions capable of being stably molded even under heat, and their moldings having good flame retardant, high impact strength, good thermal aging resistance and good moisture resistance. The compositions comprise, as the essential components, (A) a polycarbonate resin, (B) a styrenic resin, and (C) a phosphate ester compound.

14 Claims, 1 Drawing Sheet

FLAME-RETARDANT POLYCARBONATE RESIN COMPOSITION AND ITS MOLDINGS

BACKGROUND OF THE INVENTION

1. Field of the Invention

The present invention relates to a flame-retardant thermoplastic resin composition, more precisely, to a flame-retardant thermoplastic resin composition and its moldings having the advantages of good impact resistance, good oil resistance, good heat stability and good recyclability. The invention also relates to a flame-retardant polycarbonate resin composition, in particular to that having good moldability and good heat stability and therefore suitable to injection molding to give thin-walled or large-sized moldings, and relates to moldings of the resin composition as produced by molding the resin composition through injection molding. Favorably, the polycarbonate resin composition is molded through injection molding in hot runner molds to give moldings having good outward appearances.

2. Description of the Related Art

As having the advantages of impact resistance, heat resistance and good electric properties, polycarbonate resins have many applications in various fields of, for example, office automation appliances, electric and electronic appliances, car parts and building materials. However, there are some problems with polycarbonate resins in that they require high molding and working temperatures and their melt fluidity is low. Therefore, they require relatively high molding temperatures. In particular, when various additives are added thereto, their thermal stability is often lowered, and, in addition, they could not often exhibit their good properties.

As a rule, polycarbonate resins are self-extinguishable. However, some of their applications to office automation appliances, electric and electronic appliances and others require high-level flame retardancy. To meet the requirement, various flame retardants are added to polycarbonate resins.

On the other hand, moldings for parts and housings for office automation appliances such as duplicators and facsimiles and for other electric and electronic appliances such as those mentioned above shall have a complicated shape with local projections or depressions, for example, having ribs or bosses therewith, and are required to be lightweight and thin-walled from the viewpoint of resources saving. Therefore, desired are polycarbonate resin compositions having increased melt fluidity, or that is, having increased injection moldability.

On the other hand, compositions of polycarbonate resins to which are added styrene resins such as acrylonitrile-butadiene-styrene resins (ABS resins), a rubber-modified styrenic resin (HIPS), acrylonitrile-styrene resins (AS resins) and the like are known as polymer alloys, and have many applications in the field of moldings as having good heat resistance and impact resistance.

For improving the flame retardancy of polycarbonate resins, halogen—containing flame retardants such as bisphenol A halides and halogenated polycarbonate oligomers have been used along with a flame retardation promoter such as antimony oxide, as their flame-retarding ability is good. However, with the recent tendency toward safety living and environmental protection, the market requires flame retardation with non-halogen flame retardants. As non-halogen flame retardants, phosphorus—containing organic flame retardants, especially organic phosphate ester compounds may be added to polycarbonate resin compositions, for which various methods have been proposed. Such flame retardants, organic phosphate ester compounds serve also as a plasticizer, and polycarbonate resin compositions containing them exhibit excellent flame retardancy.

To meet the requirements as above, various methods have heretofore been proposed. Concretely, JP-A 61-55145 discloses a thermoplastic resin composition comprising (A) an aromatic polycarbonateresin, (B) an ABS resin, (C) an AS resin, (D) a halogen compound, (E) a phosphate, and (F) a polytetrafluoroethylene component. JP-A 2-32154 discloses a molding polycarbonate composition with high flame retardancy and high impact resistance, comprising (A) an aromatic polycarbonate resin, (B) an ABS resin, (C) an AS resin, (D) a phosphate, and (E) a polytetrafluoroethylene component. JP-A 8-239565 discloses a polycarbonate resin composition comprising (A) an aromatic polycarbonate, (B) an impact-resistant polystyrene resin with rubber-like elasticity, (C) a halogen-free phosphate, (D) a core/shell-type grafted rubber-like elastomer, and (E) talc.

These are all to improve the melt fluidity and therefore the moldability of polycarbonates, and to improve the impact resistance and the flame retardancy of the moldings of polycarbonates. As having such improved properties, the polycarbonate compositions proposed are formed into various practicable moldings.

However, in order to make the compositions comprising a polycarbonate resin and a (rubber-modified) styrenic resin and having good melt fluidity have good flame retardancy by adding thereto a phosphate ester compound, a relatively large amount of the compound must be added to the compositions. Though their flame-retarding ability is good, phosphate ester compounds often cause some problems when added to resin compositions. For example, it is said that phosphate ester compounds will corrode molds used for molding resin compositions containing them, and, in addition, the compounds will lower the impact strength of resin moldings or will yellow them in high-temperature conditions or in high-humidity conditions.

On the other hand, phosphate ester compounds serve not only as a flame retardant but also as a plasticizer for resin compositions, and they could improve the melt moldability, especially the injection moldability of resin compositions containing them. Therefore, phosphate ester compounds could be excellent additives to resin compositions for improving the properties of resin compositions containing them, but are said to be confronted with some problems. For example, polycarbonate or styrenic resin compositions containing phosphate ester compounds could have good melt moldability, especially good injection moldability, but their moldings often have poor heat stability, depending on their shape and on the molds used for producing them. In particular, when the resin compositions are molded in injection molds such as hot runner molds where resin melts being molded therein reside for a while, the resulting moldings will be often yellowed or will have silver marks on their surface. Therefore, it is difficult to stably mold the resin compositions into moldings having good appearances, and some failed moldings will be inevitable. For these reasons, adding phosphate ester compounds to resin compositions is not all the time satisfactory. Moreover, the long-term stability of the resin moldings in high-temperature condition is often poor.

In addition, depending on their type, phosphate ester compounds often bloom resin moldings. To overcome this problem, proposed is using phosphate ester compounds having a high melting point. For this, also proposed is a method of specifically defining the monomer content and the impurity content of resins to be molded. However, polycarbonate resins for molding materials generally require relatively high molding temperatures, and merely selecting the type of phosphate ester compounds for them could not satisfactorily solve the problem of low heat stability of the resin moldings. These days, in particular, hot runner molds for injection molding are much used for producing thin-walled, complicated and large-sized resin moldings, and the resin moldings to be produced in such molds through injection moldings are required to have further higher heat stability.

To meet the requirement, proposed is using high-viscosity, high-melting point phosphate ester compounds, or using different types of phosphate ester compounds as combined. In this connection, for example, known are various methods such as those described in Japanese Patent Laid-Open Nos. 228426/1994, 151493/1996, 225737/1996, 337712/1996, 95610/1997 and 249768/1997. In these laid-open patent specifications, they say that not only using phosphate ester compounds having an increased viscosity, an increased melting point and/or an increased molecular weight but also combining the compounds with monomers is preferred. In the methods disclosed, however, resin compositions often have poor moldability and often could not be molded into resin moldings having satisfactory flame retardancy and good heat resistance.

In Japanese Patent Laid-Open No. 249768/1997, proposed are phosphate oligomers serving as a flame retardant for resins. The phosphate oligomers are characterized in that they are crosslinked with a residue of bisphenol A, and have a specific phosphate monomer content of at most 1% by weight and a total metal content of at most 30 ppm by weight, and that, when heated up to 300° C. in an inert gas atmosphere at a heating rate of 100° C./min, the weight loss therein for 20 minutes is at most 15% by weight measured through TGA (thermogravimetric analysis). However, even though phosphate ester compounds serving as a flame retardant are specifically defined for molding polycarbonate resins, the problem is still inevitable in that the moldability and the heat stability of the resin compositions could not be improved to a satisfactory degree.

For improving the melt fluidity of polycarbonate resins, known is adding polycarbonate oligomers to the resins. In this method, however, the impact resistance of the resin moldings formed is lowered. To solve this problem, Japanese Patent Laid-Open No. 298421/1998 discloses a polycarbonate resin composition containing, as a flame retardant, a phosphate ester compound, and containing a polycarbonate oligomer, a thermoplastic elastomer, and a polytetrafluoroethylene having the ability of forming fibrils. The resin composition could have improved heat resistance and improved impact resistance, but the polycarbonate oligomer added thereto is not all the time effective for improving the melt fluidity of the composition. In addition, adding the polycarbonate oligomer to the resin composition will often lower the oil resistance, the high-temperature resistance and the moisture resistance of the resin moldings. What is more, another problem not solved as yet with the polycarbonate oligomer is that the oligomer added to the resin composition much worsens recycled moldings of the composition and is therefore against the recent situation in the art that increasingly requires recycling resin products.

SUMMARY OF THE INVENTION

In the current situation as above, one object of the present invention is to provide a flame-retardant, thermoplastic resin composition exhibiting good fluidity and good heat stability while molded, and to provide its moldings. Specifically, the composition which the invention is intended to provide comprises a polycarbonate resin and a styrenic resin and contains a phosphate ester compound serving as a flame retardant, and it can be molded into moldings having good flame retardancy, good aging resistance including good heat resistance and good moisture resistance, and good recyclability. Another object of the invention is to provide a flame-retardant polycarbonate resin composition containing, as a flame retardant, a phosphate ester compound, and to provide its moldings. Specifically, the composition which the invention is intended to provide has good moldability, exhibiting good heat stability while molded and used. In particular, even in hot runner molds, the composition can be stably molded through injection molding into good moldings not yellowed and not having silver marks on their surface.

To attain the objects of the invention as above, we, the present inventors have assiduously studied for improving the moldability, the heat resistance and the moisture resistance of a thermoplastic resin composition with high fluidity that comprises a polycarbonate resin and a styrenic resin and contains a phosphate ester compound serving as a flame retardant. As a result, we have found that a resin composition comprising a specific polycarbonate resin and containing, as a flame retardant, a phosphate ester compound can have good flame retardancy and improved moldability, heat resistance and oil resistance, and that the physical properties of the moldings of the composition are worsened little and the moldings are yellowed little, even when used in high-temperature and high-humidity conditions and when recycled through melt molding. On the basis of these findings, we have completed the present invention. In addition, we have further studied a flame-retardant polycarbonate resin composition containing, as a flame retardant, a phosphate ester compound, for improving the heat resistance and other properties of the composition, and, as a result, have found that, when a specific phosphate ester compound capable of serving as a flame retardant is added to a polycarbonate resin composition, then the composition can have improved heat resistance while having good flame retardancy. We have further found that the composition has good moldability, and, even in hot runner molds, it can be well molded into moldings having good appearances, and that its moldings have good heat resistance and good moisture resistance. On the basis of these findings, we have completed the present invention.

Specifically, the first aspect of the invention is to provide the following:

(1) A flame-retardant thermoplastic resin composition comprising 100 parts by weight of a resin mixture of (A) from 50 to 99% by weight of a polycarbonate resin having a molecular weight distribution (Mw/Mn) of smaller than 3 and (B) from 1 to 50% by weight of a styrenic resin, and from 1 to 30 parts by weight of (C) a phosphate ester compound;

(2) The flame-retardant thermoplastic resin composition of above (1), wherein the resin mixture is composed of (A) from 60 to 95% by weight of the polycarbonate resin and (B) from 5 to 40% by weight of a rubber-modified styrenic resin;

(3) The flame-retardant thermoplastic resin composition of above (1) or (2), which further contains from 0.05 to 5 parts by weight, relative to 100 parts by weight of the resin mixture of (A) and (B), of (D) a fluoro-olefinic resin;

(4) The flame-retardant thermoplastic resin composition of any one of above (1) to (3), which further contains from 1 to 30 parts by weight, relative to 100 parts by weight of the resin mixture of (A) and (B), of (E) a core/shell-type, grafted rubber-like elastomer;

(5) Moldings of the flame-retardant thermoplastic resin composition of any one of above (1) to (4); and (6) Housings or parts for electric or electronic appliances, as produced through injection molding of the flame-retardant thermoplastic resin composition of any one of above (1) to (4).

The second aspect of the invention provides the following:

(1) A flame-retardant polycarbonate resin composition comprising 100 parts by weight of a resin or resin mixture of (A) from 60 to 100% by weight of a polycarbonate resin and (B) from 0 to 40% by weight of a styrenic resin, and from 1 to 30 parts by weight of (C) a phosphate ester compound having an acid value of at most 1 mg KOH/g;

(2) The flame-retardant polycarbonate resin composition of above (1), wherein the monomer content of the phosphate ester compound is at most 3% by weight;

(3) The flame-retardant polycarbonate resin composition of above (1) or (2), wherein the resin mixture is composed of (A) from 60 to 97% by weight of a polycarbonate resin and (B) from 3 to 40% by weight of a modified styrenic resin;

(4) The flame-retardant polycarbonate resin composition of any one of above (1) to (3), which further contains from 0.05 to 5 parts by weight, relative to 100 parts by weight of the resin or resin mixture of (A) and (B), of (D) a fluoro-olefinic resin;

(5) The flame-retardant polycarbonate resin composition of any one of above (1) to (4), which further contains from 1 to 30 parts by weight, relative to 100 parts by weight of the resin or resin mixture of (A) and (B), of (E) a core/shell-type, grafted rubber-like elastomer;

(6) Moldings of the flame-retardant polycarbonate resin composition of any one of above (1) to (5);

(7) Injection moldings of the flame-retardant polycarbonate resin composition of any one of above (1) to (5), as produced through injection molding of the composition in hot runner molds; and (8) Moldings of above (6) or (7), which are for housings or parts for electric or electronic appliances.

DETAILED DESCRIPTION OF THE PREFERRED EMBODIMENTS

Figure 1:
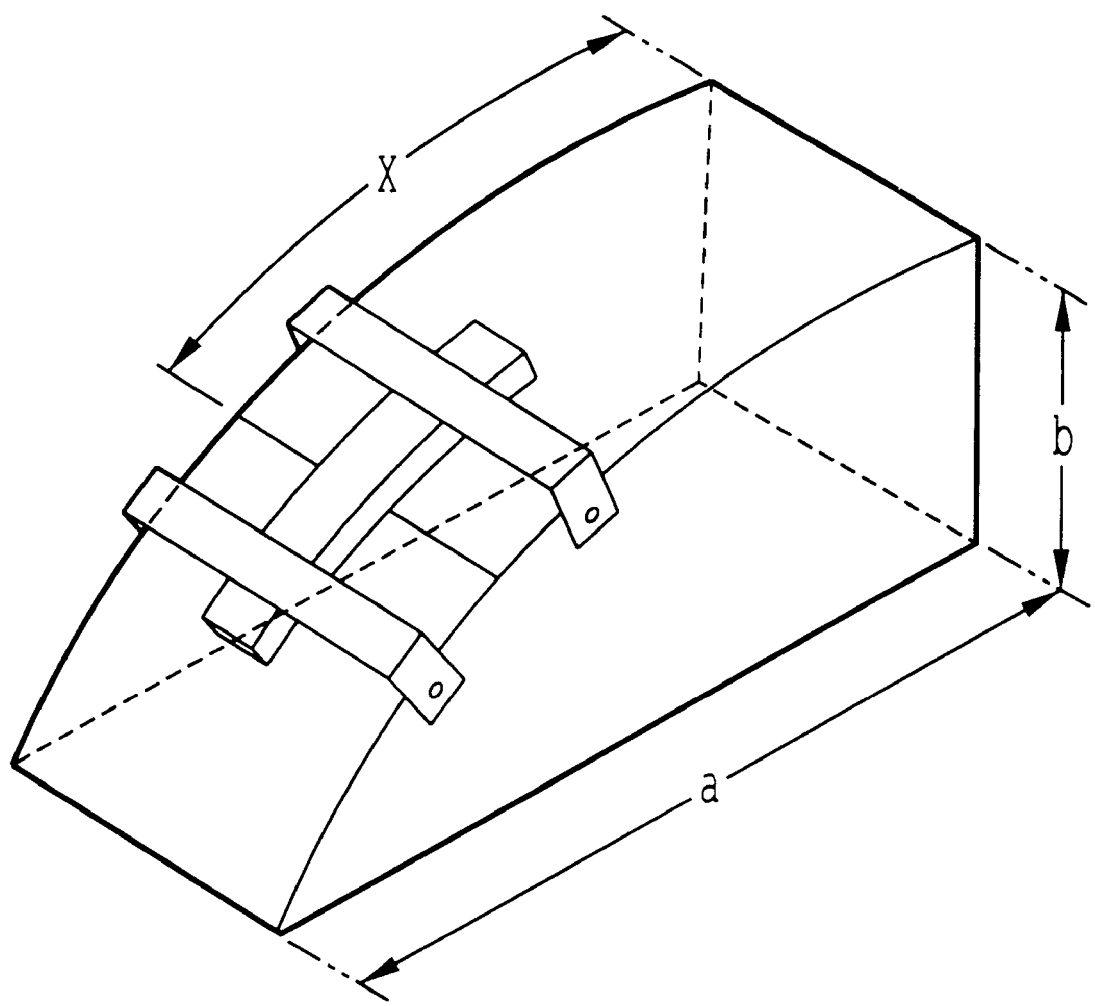
FIG. 1 is a perspective view graphically showing a test piece-fitting tool, with which the grease resistance of the flame-retardant thermoplastic resin composition of the first aspect of the invention is measured.

The first and second aspects of the invention are described in detail hereinunder with reference to their preferred embodiments.

[I] First Aspect of the Invention

The first aspect of the invention (this will be referred to as "the invention") is described in detail in this section.

First described are the components (A) to (C) constituting the flame-retardant thermoplastic resin composition of the invention.

(A) Polycarbonate Resin (PC)

The polycarbonate resin serving as the component (A) in the resin composition is not specifically defined, and may be any and every one known in the art. Generally used are aromatic polycarbonates to be produced from diphenols and carbonate precursors. For example, used are polycarbonates as produced by reacting a diphenol and a polycarbonate precursor in a solution method or in a melt method, such as those as produced through reaction of a diphenol and phosgene or through interesterification of a diphenol and a diphenyl carbonate.

Various diphenols are usable, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis (4-hydroxyphenyl) oxide, bis(4-hydroxyphenyl) sulfide, bis (4-hydroxyphenyl) sulfone, bis (4-hydroxyphenyl) sulfoxide, bis(4-hydroxyphenyl) ether, bis(4-hydroxyphenyl) ketone, etc.

As the diphenols for use herein, preferred are bis (hydroxyphenyl)alkanes, especially bisphenol A. The carbonate precursors for use in the invention include, for example, carbonyl halides, carbonyl esters, haloformates, concretely, phosgene, diphenol dihaloformates, diphenyl carbonate, dimethyl carbonate, diethyl carbonate, etc. Other diphenols such as hydroquinone, resorcinol, catechol and the like are also usable in the invention. The diphenols mentioned herein may be used either singly or as combined.

The polycarbonate resin may have a branched structure, for which the branching agent includes 1,1,1-tris(4-hydroxyphenyl)ethane, α,α',α"-tris(4-hyroxyphenyl)-1,3,5-triisopropylbenzene, phloroglucine, trimellitic acid, isatin-bis(o-cresol), etc. For controlling the molecular weight of the polycarbonate resin, employable are phenol, p-t-butylphenol, p-t-octylphenol, p-cumylphenol, etc.

The polycarbonate resin for use in the invention may be a copolymer having a polycarbonate moiety and a polyorganosiloxane moiety, or it may have a moiety of the copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

In view of its mechanical strength and moldability, the polycarbonate resin to be the component (A) in the invention preferably has a viscosity-average molecular weight of from 10,000 to 100,000, more preferably from 11,000 to 40,000. Even more preferably, it falls between 12,000 and 25,000.

The first aspect of the invention is characterized in that the polycarbonate resin to be in the composition has a molecular weight distribution (Mw/Mn) of smaller than 3. If the molecular weight distribution (Mw/Mn) of the resin is not smaller than 3, the resin composition could hardly attain the object of the invention. Preferably, therefore, the molecular weight distribution (Mw/Mn) of the resin is from 2 to smaller than 3. Limiting the molecular weight distribution of resin is specific to the thermoplastic resin composition of the invention that contains a phosphate ester compound serving as a flame retardant and contains a styrenic resin, and has heretofore been unknown in the art.

The molecular weight distribution (Mw/Mn) of the polycarbonate resin for use in the invention may be measured through GPC (gel permeation chromatography). Concretely, the condition for GPC to measure it is as follows:

GPC apparatus: Waters 484 (equipped with a UV detector).
Column: TOSO TSK GEL GMH6.
Solvent: Tetrahydrofuran.
Flow rate: 1.0 ml/min.
Column temperature: 40° C.

Under the condition as above, the molecular weight of the resin is measured in terms of polycarbonate.

(B) Styrenic Resin

The styrenic resin to be the component (B) in the resin composition of the invention may be a polymer as prepared through polymerization of a monomer or monomer mixture of from 20 to 100% by weight of a monovinylic aromatic monomer such as styrene, α-methylstyrene or the like, from 0 to 60% by weight of a vinyl cyanide—type monomer such as acrylonitrile, methacrylonitrile or the like, and from 0 to 50% by weight of any other vinylic monomer copolymerizable with those monomers, such as maleimide, methyl (meth) acrylate or the like. The polymer includes, for example, polystyrenes (GPPS), acrylonitrile-styrene copolymers (AS resins), etc.

As the styrenic resin, also preferably used herein are rubber-like polymer-modified styrenic resins. The modified styrenic resins are preferably impact-resistant styrenic resins as produced through grafting polymerization of rubber-like polymers with styrenic monomers. The rubber-modified styrenic resins include, for example, impact-resistant polystyrenes (HIPS) as produced through additional polymerization of rubber-like polymers such as polybutadiene or the like with styrene; ABS resins as produced through additional polymerization of polybutadiene with acrylonitrile and styrene; MBS resins as produced through additional polymerization of polybutadiene with methyl methacrylate and styrene, etc. These rubber-modified styrenic resins may be combined, or may be mixed with other styrenic resins not modified with rubber such as those mentioned above, and the resin mixtures may be used in the invention.

In the rubber-modified styrenic resins, the amount of the rubber-like polymer to modify them may fall, for example, between 2 and 50% by weight, but preferably between 5 and 30% by weight, furthermore, especially between 5 and 15% by weight. If the amount of the modifying rubber-like polymer is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of the rubber-like polymer include polybutadiene, acrylate and/or methacrylate—having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber, etc.

Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

The flame-retardant thermoplastic resin composition of the invention is to improve the melt flowability of the resin composition by blending a polycarbonate resin with a styrene resin. The proportions of both of the resins are that polycarbonate resin (A) is between 50 and 99% by weight, preferably between 60 and 95% by weight and styrene resin (B) is between 50 and 1% by weight, preferably between 40 and 5% by weight. When polycarbonate resin (A) is less than 50% by weight, the heat resistance, the strength are unsatisfactory. When styrene resin (B) is less than 1% by weight, the effect of improving the moldability is unsatisfactory. In this case, as this styrene resin (B), the above—mentioned rubber-modified styrene resin is preferably used.

These amounts are determined, as required, in consideration of the molecular weight of the polycarbonate resin, the type, the molecular weight and the melt index of the styrene resin, the rubber content, and the use, the size and the thickness of the molding product.

(c) phosphate ester compounds

In this invention, preferred are the halogen-free phosphate ester compounds. For example, preferred are phosphate ester compounds of the following formula (1):

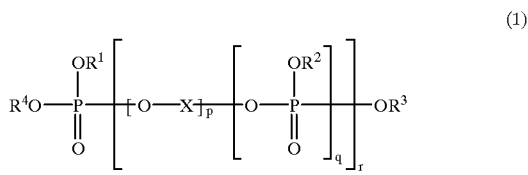

(1)

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (I), the organic group includes, for example, substituted or unsubstituted alkyl, cycloalkyl and aryl groups, etc. The substituents for the substituted groups include, for example, alkyl groups, alkoxy groups, aryl groups, aryloxy groups, arylthio groups, etc. These substituents may be combined to give arylalkoxyalkyl groups, or may be bonded, for example, via oxygen, nitrogen or sulfur atom to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, groups as derived from bisphenols of polycyclic phenols. Preferred are groups derived from bisphenol A, hydroquinone, resorcinol, diphenylolmethane, dihydroxydiphenyl, dihydroxynaphthalene, etc.

The halogen-free phosphate ester compounds may be monomers, oligomers, polymers or their mixtures. Concretely, they include, for example, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri (2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trioxybenzene triphsophate, cresyldiphenyl phosphate, etc. or the substituted compound or the condensation product and the like of these compounds.

The phosphate ester compound for use in the invention is not specifically defined with respect to its flame-retarding capability. However, for preventing the resin composition from adhering to molds and for molding the resin composition at high temperatures into thin-walled moldings, it is often desirable that the phosphate ester compound to be in the composition has a monomer content of at most 3% by weight. As the case may be, it is also desirable that the phosphate ester compound has an acid value (as measured according to JIS K6751) of at most 1 mg KOH/g, in view of the heat stability of the resin composition. Also desired is using phosphate ester compounds for which the phenol is substituted with alkyl groups or the like, in view of the moisture resistance and the heat resistance of the resin moldings.

Commercially—available, halogen-free phosphates that are preferably used as the component (C) are, for example, TPP [triphenyl phosphate], TXP [trixylenyl phosphate], CR733S [resorcinol bis(diphenyl phosphate)], PX200 [1,3-phenylene-tetrakis(2,6-dimethylphenyl) phosphate], PX201 [1,4-phenylene-tetrakis(2,6-dimethylphenyl) phosphate], PX202 [4,4'-biphenylene-tetrakis(2,6-dimethylphenyl) phosphate], all from Daihachi Chemical Industry.

The flame-retardant thermoplastic resin composition of the invention may contain a heat stabilizer. The heat stabilizer is an additive for more effectively preventing the resin composition from being degraded through thermal oxidation, including, for example, phosphorus—containing antioxidants, phenolic antioxidants, sulfur—containing antioxidants. Preferred are phosphorus—containing antioxidants, and more preferred are phosphite compounds. The phosphite compounds are esters of phosphorous acid to be prepared by independently substituting the hydrogen atoms of the acid with any of an alkyl group, an aryl group, an alkyl-substituted aryl group or the like.

The phosphite compounds include, for example, trimethyl phosphite, triethyl phosphite, tributyl phosphite, tri(2-ethylhexyl) phosphite, tributoxyethyl phosphite, triphenyl phosphite, tricresyl phosphite, trixylenyl phosphite, tris (isopropylphenyl) phosphite, trisnonylphenyl phosphite, tris (2,4-di-t-butylphenyl) phosphite, trinaphtyl phosphite, cresyldiphenyl phosphite, xylenyldiphenyl phosphite, dibutyl phosphite, distearylpentaerythritol diphosphite, bis (2,4-di-t-butylphenyl)pentaerythritol phosphite, bis(2,6-di-t-butyl-4-methylphenyl)pentaerythritol phosphite, 2,2-methylenebis(4,6-di-butylphenyl)octyl phosphite, tetrakis (2,4-di-t-butylphenyl)-4,41-biphenylene diphosphite, etc. Of those, preferred are triphenyl phosphite, tricresyl phosphite, trisnonylphenyl phosphite, and tris(2,4-di-t-butylphenyl) phosphite.

The phosphite compound to be in the resin composition may fall between 0.01 and 2 parts by weight, but preferably between 0.1 and 1 part by weight, relative to 100 parts by weight of the resin mixture of (A) and (B) in the composition. If its amount is smaller than 0.01 parts by weight, the phosphite compound will poorly exhibit its effect of improving the thermal oxidation resistance and the stability of the resin composition; but if larger than 2 parts by weight, the heat resistance of the composition will become poor and the composition will be troubled by gas when molded.

To obtain the flame-retardant thermoplastic resin composition of the invention, the specific polycarbonate resin as defined herein is selected and combined with a styrenic resin. Preferably, the constituent components are kneaded in melt in a vented, melt-kneading and molding machine, more preferably, in a vented, melt-kneading and extrusion-molding machine. In the molding machine of that preferred type, it is desirable that the components are kneaded in melt while being forcedly degassed through the vent to thereby reduce the volatile content of the resulting resin melt to the lowermost possible level.

The optional component (D), fluoro-olefinic resin that may be in the thermoplastic resin composition of the invention exhibits a resin melt-dropping preventing effect when the composition is fired. The fluoro-olefinic resin(D) is a polymer having a fluoro-olefinic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dropping is better. The fibril—forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), CD-076 (from Asahi ICI Fluoropolymers), etc.

Others except PTFE of Type 3 are also employable herein, including, for example, Argoflon F5 (from Montefluos), Polyflon MPA, FA-100 (both from Daikin Industry), etc. These polytetrafluoroethylenes (PTFEs) may be used either singly or as combined. The fibril—forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin mixture of (A) and (B). If the fluoro-olefinic resin content is smaller than 0.05 parts by weight, the resin melt-dropping preventing ability of the composition will be not enough for the intended flame retardancy of the composition. However, even if the content is larger than 5 parts by weight, the effect of the fluoro-olefinic resin added could not be augmented any more, and such a large amount of the fluoro-olefinic resin, if added to the composition, will have some negative influences on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

The flame-retardant thermoplastic resin composition of the invention may further contain a core/shell-type, grafted rubber-like elastomer as still another optional component (E) that acts to further improve the impact resistance of the moldings and the homogeneity of the composition. The amount of the optional component (E) to be in the composition may fall between 1 and 30 parts by weight, but preferably between 2 and 20 parts by weight, relative to 100 parts by weight of the components (A) and (B). The core/shell-type, grafted rubber-like elastomers are powdery or granular rubber-like elastomers having a two-layered core/shell structure in which the core is of a flexible rubber material and the shell that covers the core is of a rigid resin material. After blended with a polycarbonate melt, the rubber-like elastomers of that type mostly keep their original granular condition. Since the rubber-like elastomer keeps its original granular condition after having been blended with a polycarbonate melt, it is effective for preventing the moldings of the resin composition from being troubled by surface layer peeling.

Known are various core/shell-type, grafted rubber-like elastomers that are usable herein. Commercially—available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon), etc.

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, n-octyl methacrylate, etc. One example of the rubber-like elastomers as obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, styrene and the like. To prepare the polymer, a polyfunctional monomer serving as a crosslinking agent, such as divinylbenzene, ethylene dimethacrylate, triallyl cyanurate, triallyl isocyanurate or the like, may be added to the polymerization system.

The vinylic monomers to be polymerized in the presence of a rubber-like polymer include, for example, aromatic vinyl compounds such as styrene, α-methylstyrene, etc.; acrylates such as methyl acrylate, ethyl acrylate, etc.; methacrylates such as methyl methacrylate, ethyl methacrylate, etc. One or more these monomers may be (co)polymerized, as combined, or may be copolymerized with any other vinylic monomers such as vinyl cyanide compounds (e.g., acrylonitrile, methacrylonitrile), vinyl esters (e.g., vinyl acetate, vinyl propionate), etc. The (co)polymerization may be effected in any known method of, for example, bulk polymerization, suspension polymerization, emulsion polymerization or the like. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane component and from 5 to 95% by weight of a polyacryl (meth) acrylate rubber component as so entangled that they are not separated from each other, and has a mean grain size of from 0.01 to 1 μm or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The optional component, inorganic filler that may be in the thermoplastic resin composition of the invention is to further increase the rigidity and the flame retardancy of the moldings of the composition. The inorganic filler includes, for example, talc, mica, kaolin, diatomaceous earth, calcium carbonate, calcium sulfate, barium sulfate, glass fibers, carbon fibers, potassium titanate fibers, etc. Of those, preferred are tabular fillers of talc, mica, etc., and fibrous fillers. Talc is a hydrous silicate of magnesium, and any commercially available products of it are employable herein. Talc may contain a minor amount of aluminium oxide, calcium oxide and iron oxide, in addition to the essential components of silicic acid and magnesium oxide. In producing the resin composition of the invention, any talc even containing such minor components is employable. The inorganic filler such as talc for use in the invention generally has a mean grain size of from 0.1 to 50 μm, but preferably from 0.2 to 20 μm. Containing the inorganic filler as above, especially talc, the rigidity of the moldings of the invention is further increased and, in addition, the amount of the flame retardant, halogen-free phosphate to be in the composition could be reduced.

The amount of the inorganic filler that may be in the composition of the invention may fall between 1 to 100 parts by weight, but preferably between 2 and 50 parts by weight, relative to 100 parts by weight of the resin mixture of (A) and (B). If its amount is smaller than 1 part by weight, the inorganic filler added could not satisfactorily exhibit its effect of improving the rigidity and the flame retardancy of the moldings of the composition. However, if the amount is larger than 50 parts by weight, the impact resistance of the moldings will lower and the melt fluidity of the composition will lower. The amount of the inorganic filler to be in the composition shall be suitably determined, depending on the necessary properties of the moldings and the moldability of the composition, especially on the thickness of the moldings and the spiral flow length of the composition.

Apart from the essential components (A)~(C) and one or more optional components selected from (D) and (E), the flame-retardant thermoplastic resin composition of the invention may additionally contain any other additives which are generally added to ordinary thermoplastic resins, if desired. The additives are for further improving the moldability, the outward appearance, the weather resistance and the rigidity of the moldings of the composition.

For example, the additives include phenol type antioxidant, phosphorous containing antioxidant, sulfur containing antioxidant, antistatic agents, polyamide-polyether block copolymers (for permanent static electrification resistance), benzotriazole-type or benzophenone-type UV absorbents, hindered amine-type light stabilizers (weather-proofing agents), microbicides, compatibilizers, colorants (dyes, pigments), etc. The amount of the optional additive that maybe in the thermoplastic resin composition of the invention is not specifically defined, provided that it does not interfere with the properties of the composition.

The method for producing the flame-retardant polycarbonate resin composition of the invention is described. The composition may be produced by mixing and kneading the components (A)~(C) in a predetermined ratio as above, optionally along with the optional components (D) and (E) and with additives as above in any desired ratio.

Formulating and mixing them may be effected in any known manner, for example, by pre-mixing them in an ordinary device, such as a ribbon blender, a drum tumbler or the like, followed by further kneading the resulting pre-mix in a Henschel mixer, a Banbury mixer, a single-screw extruder, a double-screw extruder, a multi-screw extruder, a cokneader or the like. However, as so mentioned hereinabove, preferred is using a continuous extrusion-molding machine such as a single-screw extrusion-molding machine, a multi-screw extrusion-molding machine or the like equipped with a vent, in which the components being kneaded in melt are forcedly degassed through the vent. More preferably, the extrusion-molding machine for use in producing the resin composition of the invention is equipped with a plurality of feed ports as aligned in the resin flow direction. For example, the resin composition may be produced according to a method of first melting and kneading the two constituent resin components except the additive, a phosphate ester compound, followed by adding to the resulting resin melt mixture, a phosphate ester compound preferably in melt; or according to a method of first melting and kneading one constituent resin component, the specific polycarbonate resin with the additive, a phosphate ester compound, followed by adding thereto the other resin component, a styrenic resin.

The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, and it may be added to the other constituent components.

Having been prepared in the manner noted above, the thermoplastic resin composition of the invention may be molded into various moldings in the melt-molding devices as above, or, after it is pelletized, the resulting pellets maybe molded into various moldings through injection molding, injection compression molding, extrusion molding, blow molding, press molding, vacuum molding of foaming. Preferably, the composition is pelletized in the melt-kneading manner as above, and the resulting pellets are molded into moldings through injection molding or injection compression molding. The composition of the invention is especially favorable to such injection molding or injection compression molding, as the mold releasability of the resulting moldings is good. For injection molding of the composition, preferred is a gas-introducing molding method so as to prevent shrinkage cavity around the moldings and to reduce the weight of the moldings.

As having excellent heat stability, the flame-retardant thermoplastic resin composition of the invention is efficiently molded not only in direct gate-type molds but also in hot runner molds. In hot runner molds, resin melts being molded reside for a while in the hot runner zone and therefore easily undergo thermal history. In these, resins and additives are often decomposed to give gas or are often yellowed, and moldings with good appearances are difficult to produce. The present invention has solved the problem with resin compositions to be molded in such hot runner molds. Accordingly, the flame-retardant thermoplastic resin composition of the invention can be molded into thin-walled moldings and large-sized moldings, irrespective of the shape of the molds to be used for molding it.

Moldings of the thermoplastic resin composition of the invention as produced through injection molding or compression injection molding are usable as various housings and parts of office automation appliances, and electric and electronic appliances for household or industrial use, such as duplicators, facsimiles, televisions, radios, tape recorders, video decks, personal computers, printers, telephones, information terminals, refrigerators, microwave ovens, etc.

The invention is described in more detail with reference to the following Examples and Comparative Examples, which, however, are not intended to restrict the scope of the invention.

Examples I-1 to I-3, and Comparative Examples I-1 and I-2

The components shown in Table I-1 below were blended in the ratio indicated therein (the components (A) and (B) are in terms of % by weight, and the other components are in terms of parts by weight relative to 100 parts by weight of the total of (A) and (B)), fed into a vent-type double-screw extruder (TEM35 from Toshiba Machinery), melted and kneaded therein at 260° C., and then pelletized. To all compositions of Examples and Comparative Examples, added were 0.2 parts by weight of Irganox 1076 (from Ciba-Geigy) and 0.1 parts by weight of Adekastab C (from Asahi Denka Industry) serving as, both serving as an antioxidant. The resulting pellets were dried at 80° C. for 12 hours, and then molded into test pieces through injection molding at 260° C. These test pieces were tested for their properties, and their data obtained are shown in Table I-1.

The materials used for producing the test samples, and the methods for testing the samples are mentioned below.

(A) Polycarbonate

PC-1: a bisphenol A polycarbonate resin

A melt index (MI) is of 20 g/10 min (at 300° C., under a load of 1.2 kg), a viscosity—average molecular weight of 19000, and a molecular weight distribution(Mw/Mn) of 2.9.

PC-2: a bisphenol A polycarbonate resin

A melt index (MI) is of 20 g/10 min (at 300° C., under a load of 1.2 kg), a viscosity—average molecular weight of 19000, and a molecular weight distribution(Mw/Mn) of 3.2.

(B) Styrenic resin

HIPS (impact-resistant polystyrene resin,):

Idemitsu PS HT44 (from Idemitsu Petrochemical). This is a polystyrene-grafted polybutadiene (rubber-like elastomer) of which the rubber-like elastomer content is 7% by weight, and this has MI of 8 g/10 min (at 200° C., under a load of 5 kg).

ABS (polybutadiene-acrylonitrile-styrene-copolymer):

DP-611 (from Technopolymer) MI of 2 g/10 min (at 200° C, under a load of 5 kg).

(C) Phosphate ester compounds

1: Triphenyl phosphate

2: Resorcinol bis(diphenyl phosphate)

(D) Fluoroolefinic resin

Polytetrafluoroethylene (PTFE), F201L (from Daikin Chemical Industry) having a molecular weight of from 4,000,000 to 5,000,000.

(E) Core/shell-type, grafted rubber-like elastomer

Metablen S2001 (from Mitsubishi Rayon).

This is a composite rubber-grafted copolymer having a polydimethylsiloxane content of at least 50% by weight.

Testing Methods (1) SFL (spiral flow length)

Measured according to an Idemitsu method. The molding resin temperature was 240° C., and the mold temperature was 60° C. Resin samples were molded into sheets having a thickness of 3 mm and a width of 10 mm under an injection pressure of 110 MPa. The data of SFL are in terms of cm.

(2) Flame retardancy

Tested according to the UL94 combustion test. Samples tested had a thickness of 1.5 mm. V-0 ~V-2 indicate that they satisfy the practical flame.

(3) Izod impact strength

Measured according to ASTM D256. The temperature was 23° C., and the thickness of samples was ⅛inches. The data are in terms of $kJ/m^2$.

(4) Grease Resistance

Measured according to a chemical resistance measuring method (for critical strain on a ¼ oval tool).

As in FIG. 1 (perspective view), a sample piece (thickness =3 mm) to be measured was fixed on a tool (¼oval tool). Albanian grease (from Showa-Shell Petroleum) was applied to the sample piece, which was then left as it was for 48 hours. The minimum length (X) at which the sample piece cracked was read, and the critical strain (%) of the sample piece was obtained according to the following formula (1):

Critical Strain (%)
$$= (b/2a^2)[1-(1/a^2-b^2/a^4)X^2]^{-3/2-t} \quad (1)$$
where t indicates the thickness of the sample piece.
(5) High-temperature High-humidity Resistance strength at room temperature, but there are significant differences between the samples of the invention and the comparative samples with respect to the grease resistance and to the impact strength and the color change in the high-temperature and high-humidity condition employed herein.

In the following Table I-1, Example I-1 is referred to as Example 1, and the same shall apply to the other Examples and Comparative Examples.

TABLE I-1

|  |  |  | Example 1 | Comp. Ex. 1 | Example 2 | Example 3 | Comp. Ex. 2 |
|---|---|---|---|---|---|---|---|
| Composition |  |  |  |  |  |  |  |
|  | (A) | PC-1 (MW/Mn = 2.9) | 83 | — | 78 | 78 | — |
|  |  | PC-2 (Mw/Mn = 3.2) | — | 83 | — | — | 78 |
|  | (B) | HIPS | 17 | 17 | — | — | — |
|  |  | ABS | — | — | 22 | 22 | 22 |
|  | (C) | P-1 | 11 | 11 | — | — | — |
|  |  | P-2 | — | — | 11 | 11 | 11 |
|  | (D) | PTFE | 0.2 | 0.2 | 0.2 | 0.2 | 0.2 |
|  | (E) | Rubber-like elastomer | — | — | — | 5 | 5 |
| Test Results |  |  |  |  |  |  |  |
| (1) Melt Fluidity: SFL (cm) |  |  | 35 | 36 | 30 | 41 | 43 |
| (2) UL-94 (1.5 mm thick) |  |  | V-0 | V-0 | V-0 | V-0 | V-0 |
| (3) IZOD Impact Strength (kJ/m$^2$) |  |  | 40 | 40 | 60 | 60 | 60 |
| (4) Grease Resistance (critical strain) |  |  | 1.4 | 0.9 | 1.5 | 1.5 | 1.2 |
| (5) After kept in high temperature high-humidity condition (70° C., 90% RH, 300 hrs) |  |  |  |  |  |  |  |
| 1. IZOD Impact Strength (kJ/m$^2$) |  |  | 30 | 15 | 30 | 40 | 25 |
| 2. Color Change: ΔE |  |  | 0.8 | 0.8 | 1.6 | 1.8 | 1.8 |
| (6) Recyclability (100% Recycled) |  |  |  |  |  |  |  |
| 1. IZOD Impact Strength (kJ/m$^2$) |  |  | 40 | 35 | 55 | 60 | 55 |
| 2. Color Change: ΔE |  |  | 0.3 | 0.3 | 0.5 | 0.6 | 0.6 |

Moldings were heated at a temperature of 70° C. and a humidity of 90% for 300 hour.

1. After having been thus heated, the IZOD impact strength of each molding was measured.

2. Color change after heat treatment: Before and after the heat treatment, the color hue (in terms of L, a, b) of each molding was measured with a color difference meter according to JIS H7103 (yellowing test method for plastics). ΔE obtained from the data indicates the color change in the tested molding.

(6) Recyclability

Resin composition pellets were molded through injection molding into housings for notebook-size personal computers, for which the molding resin temperature was 260° C. and the mold temperature was 40° C. The moldings were ground into 100% recycled pellets, and these were again molded into housings for notebook-size personal computers and into test pieces, for which the molding resin temperature was 260° C.

1. The IZOD impact strength of the recycled test piece was measured.

2. The recycled housings were checked for their color change after heat treatment as in (5).

Obviously from the data in Table I-1 below, it is seen that the samples of the flame-retardant thermoplastic resin composition of the invention are comparable to the comparative samples with respect to the moldability and the impact

[II] Second Aspect of the Invention

The second aspect of the invention (this will be referred to as "the invention") is described in detail in this section.

First described are the components (A) to (C) constituting the flame-retardant polycarbonate resin composition of the invention.

(A) Polycarbonate resin (PC)

The polycarbonate resin (PC) to be in the flame-retardant polycarbonate resin composition of the invention is not specifically defined, and any one described in the section of the first aspect of the invention hereinabove could apply also to the second aspect of the invention. Being different from that in the first aspect described above, the PC resin for use in the second aspect of the invention is not specifically limited with respect to its molecular weight distribution (Mw/Mn).

(B) Styrenic Resin

The styrenic resin to be in the resin composition of the second aspect of the invention is not also specifically defined, and various styrenic resins such as those described and exemplified in the section of the first aspect hereinabove apply also to the second aspect in this section.

In the flame-retardant polycarbonate resin composition of the second aspect of the invention, the resin component comprises a polycarbonate resin and optionally a styrenic resin, in which the styrenic resin is to improve the melt fluidity of the resin composition. In the resin composition, the blend ratio of the two resins is preferably such that the amount of the polycarbonate resin (A) falls between 60 and 97% by weight, more preferably between 70 and 95% by weight, and the amount of the styrenic resin (B) falls between 3 and 40% by weight, more preferably between 5 and 30% by weight. If the amount of the component (A), polycarbonate resin is smaller than 60% by weight, the resin composition will have poor heat resistance and low mechanical strength. If the amount of the component (B), styrenic resin is smaller than 3% by weight, the moldability of the resin composition could not be improved to a satisfactory degree. As the styrenic resin (B), preferred is a rubber-modified styrenic resin such as that mentioned hereinabove. The blend ratio of the two resins shall be suitably determined, depending on the molecular weight of the polycarbonate resin, on the type, the molecular weight, the melt index and the rubber content of the styrenic resin, and on the use, the size and the thickness of the moldings to be made from the composition.

(C) Phosphate ester compound

The phosphate ester compound to be in the resin composition of the second aspect of the invention is not also specifically defined, and various phosphate ester compounds such as those described and exemplified in the section of the first aspect hereinabove apply also to the second aspect in this section.

In the invention, the amount of the component (C), phosphate ester compound to be in the resin composition falls between 1 and 30 parts by weight, preferably between 3 and 20 parts by weight, more preferably between 5 and 15 parts by weight, relative to 100 parts by weight of the resin or resin mixture of the polycarbonate resin (A) and optionally the styrenic resin (B). If the amount of the phosphate ester compound is smaller than 1 part by weight, the resin moldings will have poor flame retardancy; but if larger than 30 parts by weight, the heat resistance and the mechanical strength (e.g., impact resistance) of the resin moldings will be low.

The flame-retardant polycarbonate resin composition of the invention is obtained by melting and kneading the constituent components (A), (C) and optionally (B). The method of kneading them is not specifically defined. For example, employed are the following methods: (1) Two or three of the constituent components are mixed together and fed into a melt-kneading device to produce the composition; (2) A polycarbonate resin and a styrenic resin are first melted and kneaded, to which is added a phosphate ester compound, and these are again melted and kneaded; (3) A polycarbonate resin and a styrenic resin are fed into a kneader, and melted and kneaded therein, and, while they are kneaded in the kneader, a solid, liquid or molten phosphate ester compound is added thereto and kneaded together with them; (4) A polycarbonate resin is first melted and kneaded with a phosphate ester compound, and thereafter a styrenic resin is added thereto and kneaded with them. According to the melting and kneading methods, the flame-retardant polycarbonate resin composition of the invention is prepared generally in the form of resin pellets having any desired shapes. The thus—prepared resin pellets are molded into final moldings.

The flame-retardant polycarbonate resin composition of the invention is characterized in that the component (C), phosphate ester compound has an acid value of at most 1 mg KOH/g, preferably falling between 0.01 and 0.8 mg KOH/g. The acid value of the phosphate ester compound is measured according to JIS K6751. If the acid value of the phosphate ester compound is larger than 1 mg KOH/g, the heat stability of the resin composition containing the compound will be low, and when the resin composition is molded in a hot runner mold, the resulting moldings will be yellowed or will have silver marks on their surface. In addition, the moldings will be readily degraded in high-temperature (or high-humidity) conditions.

The specific phosphate ester compound for use in the invention may be selected from phosphate ester compounds produced in known methods or from those produced and purified, for example, through washing with water or alcohols, by measuring the acid value of each phosphate ester compound. Many phosphate ester compounds are known and available on the market. However, no one knows that phosphate ester compounds of which the acid value falls within the specific range defined herein are significantly effective for improving the heat stability of polycarbonate resin compositions comprising them and for improving the long-lasting heat resistance and moisture resistance of the resin moldings. Preferably, the phosphate ester compound for use in the invention, of which the acid value is defined to fall within the specific range, is controlled to have a monomer content, or that is, a monophosphate content of at most 3% by weight, more preferably falling between 0.01 and 2.5% by weight, as its effect is higher.

The polycarbonate resin composition of the invention may optionally contain a heat stabilizer. Various heat stabilizers such as those described and exemplified in the section of the first aspect hereinabove apply also to the resin composition of the second aspect in this section.

To obtain the flame-retardant polycarbonate resin composition of the invention, the specific phosphate ester compound as defined herein is selected and combined with the resin component. Preferably, the constituent components are kneaded in melt in a vented, melt-kneading and molding machine, more preferably, in a vented, melt-kneading and extrusion-molding machine. In the molding machine of that preferred type, it is desirable that the components are kneaded in melt while being forcedly degassed through the vent to thereby reduce the volatile content of the resulting resin melt to the lowermost possible level.

The flame-retardant polycarbonate resin composition of the invention may optionally contain (D) a fluoro-olefinic resin which is for preventing the resin melt from dropping down when the moldings of the composition are fired. Various fluoro-olefinic resins such as those described and exemplified in the section of the first aspect hereinabove apply also to the resin composition of the second aspect in this section.

The amount of the fluoro-olefinic resin that may be in the composition may fall between 0.05 and 5 parts by weight, preferably between 0.1 and 2 parts by weight, relative to 100 parts by weight of the resin or resin mixture of (A) and (B). If its amount is smaller than 0.05 parts by weight, the fluoro-olefinic resin could not satisfactorily exhibit its effect of preventing the resin melt from dropping down when the moldings of the composition are fired. However, even if the fluoro-olefinic resin content is larger than 5 parts by weight, the effect of the fluoro-olefinic resin added could not be augmented any more, and such a large amount of the fluoro-olefinic resin, if added to the composition, will have some negative influences on the impact resistance and the outward appearances of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention may further contain a core/shell-type rubber-like elastomer, as a still another optional component (E), which further enhances the impact resistance and the uniformity of the moldings of the composition. The rubber-like elastomer content of the composition may fall between 1 and 30 parts by weight, preferably between 2 and 20 parts by weight, relative to 100 parts by weight of the resin or resin mixture of (A) and (B) in the composition. Various core/shell-type rubber-like elastomers such as those described and exemplified in the section of the first aspect hereinabove apply also to the resin composition of the second aspect in this section.

The flame-retardant polycarbonate resin composition of the invention may optionally contain an inorganic filler which is to further enhance the rigidity and the flame retardancy of the moldings of the composition. Various inorganic fillers such as those described and exemplified in the section of the first aspect hereinabove apply also to the resin composition of the second aspect in this section. Regarding the amount of the filler to be in the composition, the same as in the section of the first aspect also apply to the second aspect in this section.

Apart from the essential components and the optional components (D) and (E) mentioned above, the flame-retardant polycarbonate resin composition of the invention may further contain any other additives which are generally added to ordinary thermoplastic resins, if desired. The additives are for further improving the moldability of the composition and for further improving the impact resistance, the outward appearances, the weather resistance and the rigidity of the moldings of the composition. Various additives such as those described and exemplified in the section of the first aspect hereinabove apply also to the resin composition of the second aspect in this section.

Regarding the method for producing the flame-retardant polycarbonate resin composition of the second aspect of the invention, the same as in the section of the first aspect also apply to the composition in this section. Regarding the heating temperature in the step of melting and kneading the constituent components, the same as in the section of the first aspect also apply to the composition in this section. Regarding the method of producing various moldings of the flame-retardant polycarbonate resin composition of the invention, the same as in the section of the first aspect also apply to the composition in this section. Like the composition of the first aspect mentioned hereinabove, the composition of the second aspect in this section is also efficiently molded not only in direct gate-type molds but also in hot runner molds.

Moldings of the thermoplastic resin composition of the invention as produced through injection molding or compression injection molding are usable as various housings and parts of office automation appliances, and electric and electronic appliances for household or industrial use, such as duplicators, facsimiles, televisions, radios, tape recorders, video decks, personal computers, printers, telephones, information terminals, refrigerators, microwave ovens, etc.

The invention is described in more detail with reference to the following Examples and Comparative Examples, which, however, are not intended to restrict the scope of the invention.

Examples II-1 to II-6, and Comparative Examples II-1 and II-2

The components shown in Table II-1 below were blended in the ratio indicated therein (the components (A) and (B) are in terms of % by weight, and the other components are in terms of parts by weight relative to 100 parts by weight of the total of (A) and (B)), fed into a vent-type double-screw extruder (TEM35 from Toshiba Machinery), melted and kneaded therein at 260° C., and then pelletized. To all compositions of Examples and Comparative Examples, added were 0.2 parts by weight of Irganox 1076 (from Ciba-Geigy) and 0.1 parts of Adekastab C (from Asahi Denka Industry) serving as, both serving as an antioxidant. The resulting pellets were dried at 80° C. for 12 hours, and then molded into test pieces through injection molding at 260° C. These test pieces were tested for their properties, and their data obtained are shown in Table I-1.

The materials used for producing the test samples, and the methods for testing the samples are mentioned below.

(A) Polycarbonate

PC-1: a bisphenol A polycarbonate resin

Toughlon A1900 (from Idemitsu Petrochemical) having a melt index (MI) of 20 g/10 min (at 300° C., under a load of 1.2 kg), and a viscosity—average molecular weight of 19000.

(B) Styrenic resin

HIPS (impact-resistant polystyrene resin,):

Idemitsu PS HT44 (from Idemitsu Petrochemical). This is a polystyrene-grafted polybutadiene (rubber-like elastomer) of which the rubber-like elastomer content is 7% by weight, and this has MI of 8 g/10 min (at 200° C., under a load of 5 kg).

ABS (polybutadiene-acrylonitrile-styrene-copolymer)

DP-611 (from Technopolymer) having a MI of 2 g/10 min (at 200° C., under a load of 5 kg).

(C) Phosphate ester compounds

P-1: Bisphenol A bis(diphenyl phosphate)

BDP(from Aczo-Kashima) having an acid value is 0.3 mg KOH/g, and the TPP (Tripheny phosphate) content is 1% by weight.

P-2: Resorcinol bis(diphenyl phosphate)

CR-733S (from Daihachi Chemical Industry) having an acid value is 0.1 mg KOH/g, and the TPP (Triphenyl phosphate) content is 2% by weight.

P-3: Resorcinol bis(diphenyl phosphate)

PFR(from Asahi Denka Industry) having an acid value is 0.1 mg KOH/g, and the TPP(Triphenyl phosphate) content is 4% by weight.

P-4: Bisphenol A bis(diphenyl phosphate)

CR-741 (from Daihachi Chemical Industry) having an acid value is 1.6 mg KOH/g, and the TPP (Triphenyl phosphate) content is 1% by weight.

(D) Fluoroolefinic resin

Polytetrafluoroethylene (PTFE), F201L (from Daikin Chemical Industry) having a molecular weight of from 4,000,000 to 5,000,000.

(E) Core/shell-type, grafted rubber-like elastomer

Metablen S2001 (from Mitsubishi Rayon). This is a composite rubber-grafted copolymer having a polydimethylsiloxane content of at least 50% by weight.

Testing Methods (1) SFL (spiral flow length)

Measured according to an Idemitsu method. The molding resin temperature was 240° C., and the mold temperature was 60° C. Resin samples were molded into sheets having a thickness of 3 mm and a width of 10 mm under an injection pressure of 110 MPa. The data of SFL are in terms of cm.

(2) Moldability in Hot Runner Molds

Using an injection molding machine (Toshiba Kikai's IS650t) equipped with a hot runner mold for housings for notebook-size (A4 sheet-size) personal computers, resin compositions were molded to test their moldability in the hot runner mold. The molding resin temperature was 240° C., the hot runner temperature was 260° C. and the mold temperature was 40° C.

(3) Resin Adhesion to Molds

Using a laboratory mold for forming test pieces, resin compositions were molded. The molding resin temperature was 260° C., and the mold temperature was 40° C. After 100 shots from each sample, the inner surface of the mold was macroscopically checked for the presence or absence of resin adhesion thereto.

(4) Flame retardancy

Tested according to the UL94 combustion test. Samples tested had a thickness of 1.5 mm. V-0 ~V-2 indicate that they satisfy the practical flame.

(5) Izod impact strength

Measured according to ASTM D256. The temperature was 23° C., and the thickness of samples was ⅛ inches. The data are in terms of $kJ/m^2$.

(6) Durability

1. Thermal aging resistance (impact strength change)

Moldings were heated at 80° C. for 300 hours, and their IZOD impact strength was measured.

2. Thermal aging resistance (color change)

Before and after the heat treatment, the color hue (in terms of L, a, b) of each molding was measured with a color difference meter according to JIS H7103 (yellowing test method for plastics). ΔE obtained from the data indicates the color change in the tested molding.

3. Moisture resistance (impact strength change)

Moldings were heated at 70° C. and a humidity of 90% for 300 hours, and their IZOD impact strength was measured.

4. Moisture resistance (color change)

Same as in 2.

Obviously from the data in Table II-1 below, especially from those of the impact strength and the color tone of the samples tested, it is seen that the flame-retardant polycarbonate resin composition of the invention has good moldability and its moldings all have good thermal aging resistance and moisture resistance. In addition, it is seen therefrom that adding a core/shell-type, grafted rubber-like elastomer to the composition much improves the impact strength of the moldings of the composition.

In the following Table II-1, Example II-1 is referred to as Example 1, and the same shall apply to the other Examples and Comparative Examples.

TABLE II-1

| | | | Ex. 1 | Ex. 2 | Comp. Ex. 1 | Ex. 3 | Comp. Ex. 2 | Ex. 4 | Ex. 5 | Ex. 6 |
|---|---|---|---|---|---|---|---|---|---|---|
| Composition | | | | | | | | | | |
| | (A) | PC | 100 | 100 | 100 | 85 | 85 | 82 | 82 | 76 |
| | (B) | HIPS | — | — | — | 15 | 15 | 18 | 18 | — |
| | | ABS | — | — | — | — | — | — | — | 24 |
| | (C) | P-1 acid value 0.3 | 6 | 6 | — | 14 | — | — | 18 | 18 |
| | | P-2 acid value 0.1 | — | — | — | — | — | 12 | — | — |
| | | P-3 acid value 0.1 | — | — | — | — | — | — | 12 | — |
| | | P-4 acid value 1.6 | — | — | 6 | — | 14 | — | — | — |
| | (D) | PTFE | 0.2 | 0.2 | 0.2 | 0.2 | 0.2 | 0.2 | 0.2 | 0.2 |
| | (E) | Rubber-like Elastomer | — | 3 | 3 | — | — | 5 | 5 | — |
| Test Data | | | | | | | | | | |
| (1) | Melt Fluidity ML (g/10 min) | | 4 | 6 | 6 | 36 | 37 | 35 | 35 | 40 |
| (2) | Moldability In Hot Runner Molds | | Good. | Good. | Silver marks formed, and yellowed. | Good. | Yellowed. | Good. | Good. | Good. |
| (3) | Resin Adhesion to Molds | | Yes, but little. | Yes, but little. | Yes, but little. | Yes, but little. | Yes, but little. | Yes, but little. | Yes, in some degree. | Yes, but little. |
| (4) | UL-94 (1.5 mm thick) | | V-0 | V-0 | V-0 | V-0 | V-0 | V-0 | V-0 | V-0 |
| (5) | IZOD Impact Strength ($kJ/m^2$) | | 18 | 76 | 78 | 35 | 38 | 65 | 65 | 62 |
| (6) | Durability | | | | | | | | | |
| 1. | Thermal Aging Resistance: IZOD impact strength ($kJ/m^2$) | | 16 | 68 | 40 | 26 | 15 | 57 | 53 | 53 |
| 2. | Thermal Aging Resistance: color change ΔE | | 0.3 | 0.3 | 0.5 | 1.2 | 2.0 | 1.1 | 1.1 | 1.9 |
| 3. | Moisture Resistance: IZOD impact stength ($kJ/m^2$) | | 10 | 65 | 16 | 21 | 8 | 53 | 53 | 45 |
| 4. | Moisture Resistance: color change ΔE | | 0.5 | 0.8 | 1.3 | 1.6 | 2.8 | 1.6 | 1.6 | 2.5 |

As described in detail hereinabove, the flame-retardant thermoplastic resin composition of the first aspect of the invention and the flame-retardant polycarbonate resin composition of the second aspect thereof both contain no halogen and have good flame retardancy and high impact strength, and while being molded under heat, they are all stable. In addition, the moldings of the compositions all have good thermal aging resistance and good moisture resistance. Further, the moldings are well recycled, and are therefore favorable for protecting the environment and for saving the natural resources. Adding a core/shell-type, grafted rubber-like elastomer to the compositions much improves the uniformity, the impact strength and the durability of the moldings of the compositions. The resin compositions of the invention are well molded into large-sized and thin-walled moldings of many applications to, for example, office automation appliances, information and communication appliances, other electric and electronic appliances for household use, and car parts.

What is claimed is:

1. A flame-retardant thermoplastic resin composition consisting essentially of 100 parts by weight of a resin mixture of (A) from 50 to 99% by weight of a polycarbonate resin having molecular weight distribution (Mw/Mn) of smaller than 3 and (B) from 1 to 50% by weight of a styrenic resin, and from 1 to 30 parts by weight (C) a phosphate ester monomer oligomer or polymer, or mixtures thereof, and further 0.05 to 5 parts by weight of (D) a fluoro-olefinic resin, relative to 100 parts by weight of the resin mixture of (A) and (B)

2. The flame-retardant thermoplastic resin composition as claimed in claim 1, wherein the resin mixture is composed of (A) from 60 to 95% by weight of the polycarbonate resin and (B) from 5 to 40% by weight of a rubber-modified styrenic resin.

3. A flame-retardant polycarbonate resin composition consisting essentially of 100 parts by weight of a resin or resin mixture of (A) from 60 to 100% by weight of a polycarbonate resin and (B) from 0 to 40% by weight of a styrenic resin, and from 1 to 30 parts by weight of (C) a phosphate ester monomer, oligomer or polymer, or mixtures thereof having an acid value of at most 1 mg KOH/g, and further contains from 0.05 to 5 parts by weight of (D) a fluoro-olefinic resin, relative to 100 parts by weight of the resin or resin mixture of (A) and (B).

4. The flame-retardant thermoplastic resin composition as claimed in claim 1, which further contains from 1 to 30 parts by weight, relative to 100 parts by weight of the resin mixture of (A) and (B), of (E) a core/shell, grafted rubbery elastomer.

5. Moldings of the flame-retardant thermoplastic resin composition of any one of claims 1, 2 or 4.

6. Housings or parts for electric or electronic appliances produced through injection molding of the flame-retardant thermoplastic resin composition of any one of claims 1, 2 or 4.

7. Injection moldings of the flame-retardant polycarbonate resin composition of any one of claims 1, 2 or 4 produced through injection molding of the composition in hot runner molds.

8. The flame-retardant polycarbonate resin composition as claimed in claim 3, wherein the content of the phosphate ester monomer, oligomer or polymer, or mixtures thereof, is at most 3% by weight.

9. The flame-retardant polycarbonate resin composition as claimed in claim 3, wherein the resin mixture is composed of (A) from 60 to 97% weight of a polycarbonate resin and (B) from 3 to 40% by weight of a rubber-modified styrenic resin.

10. The flame-retardant polycarbonate resin composition as claimed in claim 3, which further contains from 1 to 30 parts by weight, relative to 100 parts by weight of the resin or resin mixture of (A) and (B), of (E) a core/shell-type, grafted rubber-like elastomer.

11. Moldings of the flame-retardant polycarbonate resin of any one of claims 3 to 9 or 10 produced through injection moldings of the composition of hot runner molds.

12. Moldings of the flame-retardant polycarbonate resin composition of any one of claims 3 to 9, or 10.

13. Injection moldings of the flame-retardant polycarbonate resin composition of any one of claims 3 to 9, or 10 produced through injection molding of the composition in hot runner molds.

14. Housings or parts for electric or electronic appliances produced through injection molding of the flame-retardant thermoplastic resin composition of any one of claims 3 to 9, or 10.

* * * * *